United States Patent [19]

Fukushima et al.

[11] Patent Number: 4,955,006
[45] Date of Patent: Sep. 4, 1990

[54] FLOATING TYPE MAGNETO-OPTIC DISK READING HEAD SYSTEM HAVING EXTERNAL SEMICONDUCTOR LASER RESONATOR OPERATING AT ORTHOGONAL TWO MODE OSCILLATIONS

[75] Inventors: Nobuhiro Fukushima, Kawasaki; Ippei Sawaki, Sagamihara, both of Japan

[73] Assignee: Fujitsu Limited, Kawasaki, Japan

[21] Appl. No.: 295,753

[22] Filed: Jan. 11, 1989

[30] Foreign Application Priority Data

Jan. 13, 1988 [JP] Japan .............................. 63-005427
Aug. 30, 1988 [JP] Japan .............................. 63-216718

[51] Int. Cl.$^5$ ...................... G11B 11/12; G11B 13/04
[52] U.S. Cl. ..................................... 369/13; 360/114; 360/59
[58] Field of Search .................. 369/13, 109, 110, 116, 369/121, 122; 360/114, 59; 365/122; 372/27

[56] References Cited

U.S. PATENT DOCUMENTS

| | | | |
|---|---|---|---|
| 4,305,046 | 12/1981 | Le Hoch et al. | 372/27 X |
| 4,410,277 | 10/1983 | Yamamoto et al. | 360/114 X |
| 4,571,650 | 2/1986 | Ojima et al. | 369/13 X |
| 4,637,027 | 1/1987 | Shirasaki et al. | 372/27 |
| 4,811,329 | 3/1989 | Shikama et al. | 369/116 |

FOREIGN PATENT DOCUMENTS

| | | | |
|---|---|---|---|
| 59-36345 | 2/1984 | Japan | 369/13 |
| 60-68684 | 4/1985 | Japan . | |
| 60-69573 | 4/1985 | Japan . | |
| 61-134943 | 6/1986 | Japan . | |

OTHER PUBLICATIONS

"Writable Optical Disk", Feb. 8, 1988, Nikkei Electronics 1988, 2. 8 (No. 440), pp. 115–119.
"Current Status of Development of Magneto-optic Disk", Nikkei Byte, Mar. 1985, pp. 94–98.
Ukita et al., "Readout Characteristics of a Spontaneous and Stimulated Emission Optical (SAS) Head", Isom '87, Sep. 16–18, 1987, Tokyo Japan.

Primary Examiner—Stuart S. Levy
Assistant Examiner—Hoa Nguyen
Attorney, Agent, or Firm—Staas & Halsey

[57] ABSTRACT

A magneto-optic disk reading head system including an external semiconductor laser resonator. A magneto-optic disk forms a part of the external resonator. In the external resonator, orthogonal two mode oscillations are established to produce a beat signal used for reading data stored in the magneto-optic disk. The magneto-optic disk reading head system is a floating type reading head.

14 Claims, 11 Drawing Sheets

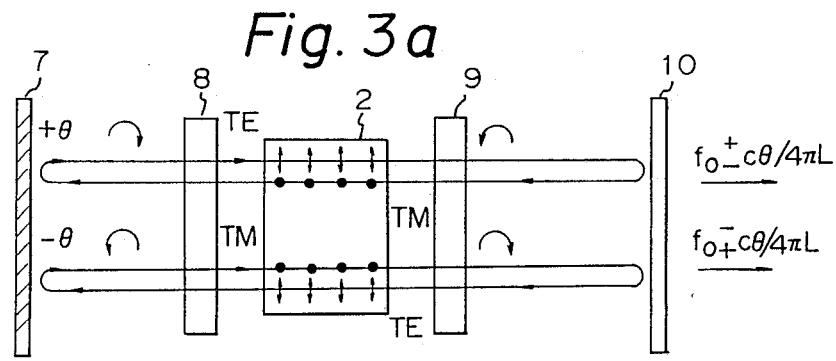
Fig. 3a
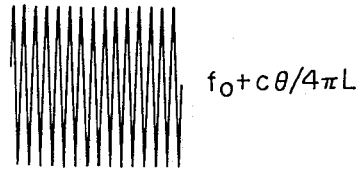
Fig. 3b    $f_0 + c\theta/4\pi L$
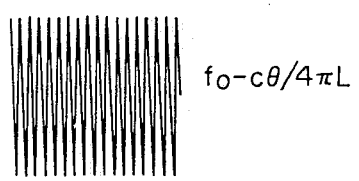
Fig. 3c    $f_0 - c\theta/4\pi L$
Fig. 3d
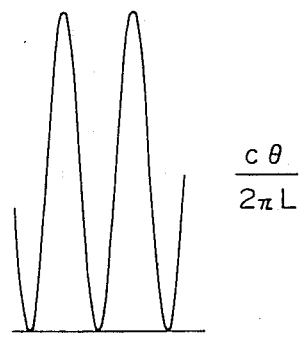
Fig. 3e    $\dfrac{c\theta}{2\pi L}$

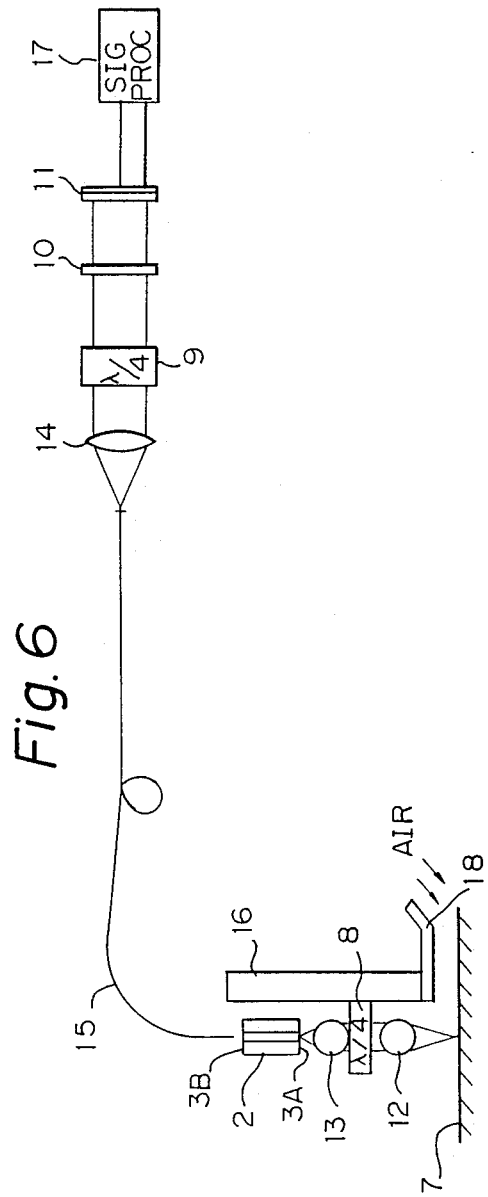
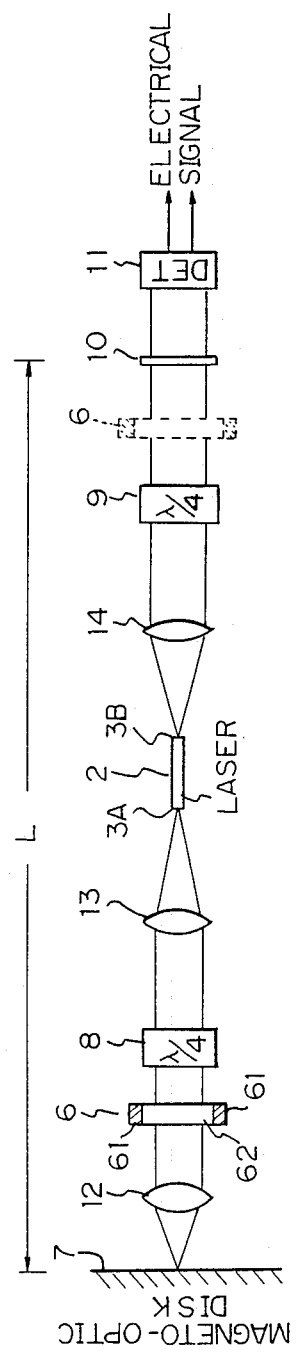

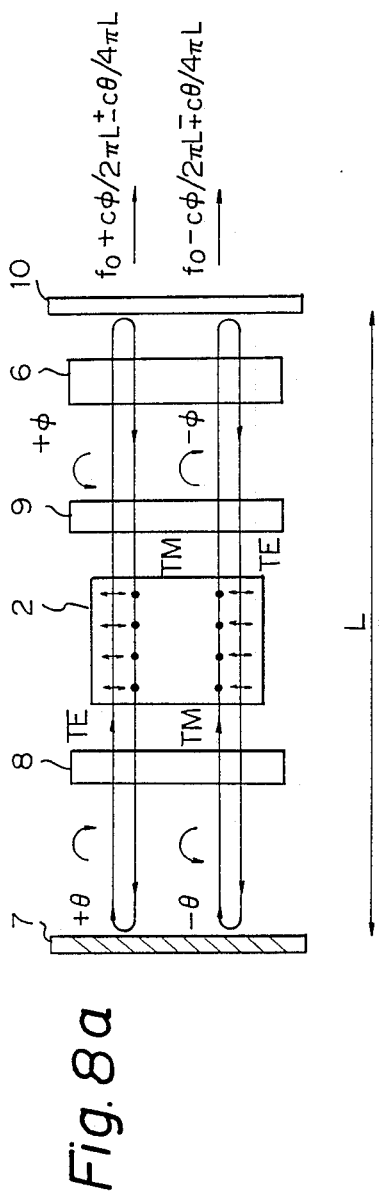
Fig. 8a
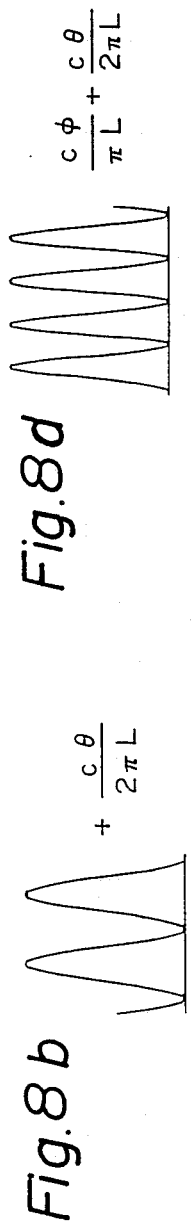
Fig. 8b
Fig. 8c
Fig. 8d
Fig. 8e

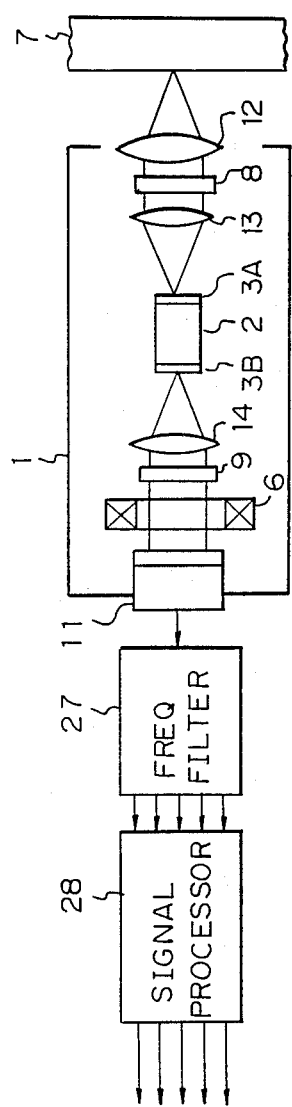

FLOATING TYPE MAGNETO-OPTIC DISK READING HEAD SYSTEM HAVING EXTERNAL SEMICONDUCTOR LASER RESONATOR OPERATING AT ORTHOGONAL TWO MODE OSCILLATIONS

BACKGROUND OF THE INVENTION

1. Field of the Invention

The present invention relates to a magneto-optic disk system, more particularly, to a floating type magneto-optic disk reading head system used in a magneto-optic disk system, having an external semiconductor laser resonator which operates at orthogonal two mode oscillations.

2. Description of the Related Art

JPA 61-134943 discloses a reading head in an optical disk system; the reading head comprises a semiconductor laser. A non-reflective film is provided at an end of the laser facing an optical disk, and a film having a high reflectivity is provided at another end of the laser facing an optical fiber, for detecting read data. When the laser is energized, a laser oscillation, i.e., a resonation, is established between the high reflectivity film and the optical disk. Namely, the optical disk, the laser, and the high reflectivity film cooperate and function as an external resonator. The optical disk is provided with pitted portions wherein data is stored and non-pitted portions where data is not stored. A reflectivity at a pitted portion is lower than that at a non-pitted portion. When a laser light emitted from the laser exposes a pitted portion, a low laser oscillation occurs, and thus little light is received at the optical fiber. Conversely, when the laser light exposes a non-pitted portion, a high laser oscillation occurs, and thus a high amplitude light is received at the optical fiber. The data reproduction of the optical disk system is made by using this difference in the light received for a data read.

Magneto-optic disk systems, which are known as rewritable optical disks and are operated by an optical-magnetical recording method using a Kerr effect, are now in practical use. In the magneto-optic disk systems, an optical modulator or a magnetic field modulation is adopted (NIKKEI BYTE, 1985, March, pp. 94–98, NIKKEI ELECTRONICS, 1988, 2, 8, No. 440, pp. 115–119) and in both modulations, a phase change in a vertical magnetized film of a magneto-optic disk is used for reading and writing data, i.e., the phase change is detected by using the Kerr effect. Namely, in the magneto-optic disk system, the difference of the reflectivity of the optical disk set forth above can not be adopted for reading data, and as a result, the external resonator described above can not be applied to the magneto-optic disk head.

U.S. Pat. No. 4,637,027 based upon Japanese patent application No. 58-177233 (JPA 60-68684) and Japanese patent application No. 58-177227 (JPA 60-69573) discloses a laser light source device having a resonator, and used for a detection of various physical properties, for example, a magnetic field. The external resonator includes a reflection mirror, a first quarter wave ($\lambda/4$) plate, a semiconductor laser, a second quarter wave plate, a Faraday rotator, and an output mirror such as a half mirror. A first signal having a frequency $(f+\Delta f)$ and a second signal having a frequency $(f-\Delta f)$ are output from the output mirror, and a frequency of a beat signal obtained by an interaction of the first and second signals is $c\phi/\pi L$; where $c$ denotes a speed of a light, $\phi$ denotes a rotation angle of the Faraday rotator, and $L$ denotes an effective cavity length of the external resonator. This frequency, however, is low, and thus detection of the frequency is difficult. Further, the reflection mirror forming a part of the resonator is only a mirror.

A prior art reading head for a magneto-optic disk system is very complex and heavy, and as a result, a high speed access cannot be obtained.

Ukita, et al., proposes a floating type reading head used in an optical disk system ("Read out Characteristic of Micro Optical Head Operated in Bi-Stable Mode", ISOM '87). This reading head uses a change of the reflectivity discussed above, and thus cannot be used for a magneto-optic disk reading head. Accordingly, a compact and light weight reading head for a magnetic-optic disk system is still required.

SUMMARY OF THE INVENTION

An object of the present invention is to provide a magneto-optic disk head system which enables correct and easy reading of data, and a stable and reliable operation.

Another object of the present invention is to provide a magneto-optic disk head system which is compact and light weight.

According to the present invention, there is provided a magneto-optic disk reading head system for reading data magneto-optically stored in a magneto-optic disk, including an orthogonal two mode oscillation type resonator formed by a predetermined effective cavity length and outputting a beat signal indicating the stored data. The resonator includes a laser unit including a semiconductor laser for emitting orthogonal two mode lights from one end thereof, a first polarization unit, provided to receive the lights emitted from the laser unit, for polarizing the received two mode lights, the magneto-optic disk, provided to receive the two polarized lights, for changing angles of the incident polarization lights in response to the data and for reflecting the angle changed incident polarization lights to the first polarization unit to be further polarized threat, the laser unit passing the further polarized lights to another end, a second polarization unit, provided to receive the two lights passed through the laser unit, for polarizing the received lights, and a semi-transparent mirror unit, provided to receive the two lights polarized at the second polarization unit, for reflecting the incident lights to the second polarization unit to be further polarized threat, and passing a beat light produced by an interaction of the incident two lights.

The lights further polarized at the second polarization unit is directed to and passing through the laser unit. A distance between the magneto-optic disk and the semi-transparent mirror unit defines the effective cavity length. The resonator substantially resonates the orthogonal two mode lights therein. The beat light output from the semi-transparent mirror unit has a frequency defined by the effective cavity length and the angle changed at the magneto-optic disk.

The first polarization unit may comprise a first quarter wave plate, and the second polarization unit may comprise a second quarter wave plate.

The magneto-optic disk reading head system may further include an optical detection unit, provided to receive the beat light, for detecting the beat light and converting the detected beat light to an electrical signal.

The magneto-optic disk reading head system may further include a filter circuit, operatively connected to the optical detection unit, having a predetermined center frequency corresponding to the frequency of the beat light, for extracting a signal indicating the data stored in the magneto-optic disk.

The resonator may further include a Faraday rotator provided between the magneto-optic disk and the first quarter wave plate or between the second quarter wave plate and the semitransparent mirror unit. The Faraday rotator has a rotation angle greater than the angle changed at the magneto-optic disk, and an output light output from the semitransparent mirror unit is a frequency shift keying modulation (FSK) light signal.

The magneto-optic disk reading head system may further include an optical detection circuit, provided to receive the FSK light signal, for detecting the FSK light signal and converting it to an electrical signal.

The magneto-optic disk reading head system may further include a FSK signal processing circuit for extracting a signal indicating the data stored in the magneto-optic disk.

The magneto-optic disk reading head system may further includes a servo signal generation circuit, operatively connected to the optical detecting circuit, for generating a servo signal from the beat signal and the servo signal is used for driving a moving portion of the reading head in a radial direction of the magneto-optic disk. Also, the magneto-optic disk reading head system may further include a focus control signal generation circuit, operatively connected to the optical detection circuit, for generating a focus control signal by comparing a zero-order mode signal contained in the beat signal and indicating the stored data and one or more-order mode signal contained in the beat signal, the focus control signal being used for controlling a focus of the incident lights to the magneto-optic disk.

A magneto-optic disk reading head system may further comprise a floating type actuator unit which is floated by air forced into a gap between the magneto-optic disk and the actuator unit, and moved in a radial direction of the magneto-optic disk and/or a focusing direction perpendicular to the radial direction, the air being generated in response to a rotation of the magneto-optic disk.

The first polarization unit is mounted on the actuator unit, and the first polarization unit and the laser in the laser unit are optically connected by an optical fiber. Or, the first polarization unit and the laser in the laser unit are mounted on the actuator unit, and the laser and the second polarization unit are optically connected by an optical fiber.

BRIEF DESCRIPTION OF THE DRAWINGS

Other objects and features of the present invention will be described below in detail with reference to the accompanying drawings, in which:

FIGS. 3a to 3e are schematic representations of the operation of the magneto-optic disk reading head shown in FIG. 1;

FIGS. 5 and 6 are diagrams of specific magneto-optic disk reading heads of the present invention;

FIG. 7 is a block diagram of another embodiment of a magneto-optic disk reading head in accordance with the present invention;

FIGS. 8a to 8d are views representing the operation of the magneto-optic disk reading head shown in FIG. 7;

FIG. 17 is a block diagram of yet another embodiment of a magneto-optic disk reading head in accordance with the present invention.

DESCRIPTION OF THE PREFERRED EMBODIMENTS

Figure 1:
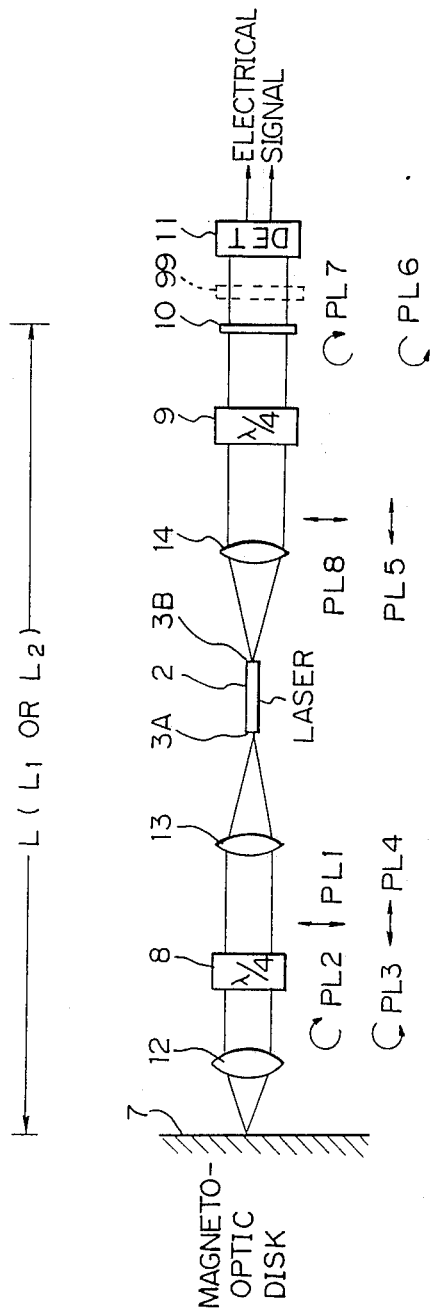
FIG. 1 is a block diagram of an embodiment of a magneto-optic disk reading head in accordance with the present invention.

Referring to FIG. 1, a floating type magneto-optic disk reading head includes a semiconductor laser 2, a magneto-optic disk 7 which forms a part of the magneto-optic disk reading head and functions as a part of an external resonator described later, and a first quarter wave ($\lambda/4$) plate 8 provided between the magneto-optic disk 7 and the laser 2. The magneto-optic disk reading head also includes a second quarter wave plate 9, an output mirror 10, and a light detector 11, such as a PIN photo diode, or an APD, etc. Both ends of the laser 2 are given an anti-reflection (AR) coating and provided with non-reflective films 3A and 3B. The magneto-optic disk reading head further includes a first collimating lens 13 provided between the laser 2 and the first quarter wave plate 8, an objective lens 12 provided between the quarter wave plate 8 and the magneto-optic disk 7, and a second collimating lens 14 provided between the laser 2 and the second quarter wave plate 9.

In this magneto-optic disk reading head, two mode signals which orthogonally intersect each other, for example, a TE wave signal and a TM wave signal, or a right (or clockwise)-rotated circular polarization light and a left (or anti clockwise)-rotated polarization light, are generated by the external resonator, and reflected at the magneto-optic disk 7. When the two mode signals are reflected, a difference of an oscillation frequency appears between the two mode signals due to a Kerr rotation of a magneto-optic effect of the two mode signals, and an interference signal of these reflected mode signals is detected to read a magneto-optic signal stored in the magneto-optic disk 7.

The above operation will now be described in more detail.

First, the generation of the two mode signals by the external resonator will be described. The laser 2 generates linear polarization signals having directions of oscillation which cross each other on a perpendicular line. The quarter wave plate 8 or 9 functions as an element through which the light signal is emitted and returned in such a manner that the polarization plane is rotated by 90°. Two linear polarization signals, i.e., the TE and TM wave signals or the right- and left-rotated circular polarization signals, are an eigen-mode of the external resonator.

A first oscillation mode will be now described. The TM wave, which is irradiated from the end film 3A of the semiconductor laser 2 and is a vertical linear polarization signal PL1, is given a circular polarization by the first quarter wave plate 8. This right-rotated circular polarization signal PL2 obtained through the quarter wave plate 8 is focused on the magneto-optic disk 7 by the objective lens 12. The incident right-rotated circular polarization signal PL2 is reflected at the magneto-optic disk 7 and changed to a left-rotated circular polarization signal PL3.

Namely, the Kerr rotation of the reflected signal depends upon a magnetization or non-magnetization of a surface, and further, a direction of such magnetization. When the circular polarization light is incident on a point which is not magnetized, a Kerr rotation of the reflected light does not occur. Conversely, when the circular polarization light is incident on a point which is magnetized, the direction of the Kerr rotation of the reflected light is reversed by the direction of the magnetization. The left-rotated circular polarization signal PL3 is further changed to a horizontal linear polarization signal PL4, which is the TE wave signal and perpendicularly intersects the vertical linear polarization signal PL1 emitted from the laser 2, by the quarter wave plate 8. A horizontal linear polarization signal PL5, which is the horizontal polarization signal PL4 after passage through the laser 2, is changed to a left-rotated circular polarization signal PL6 by the quarter wave plate 9. A part of the left-rotated circular polarization signal PL6, which is light incident on the output mirror 10, for example, a half mirror, and reflected thereat, is changed to a right-rotated circular polarization signal PL7 at the output mirror 10, and then changed to a vertical linear polarization signal PL8, at the quarter wave plate 9, which perpendicularly intersects the horizontal linear polarization signal PL5. The vertical line polarization signal PL8 is again passed through the semiconductor laser 2 and become the vertical line polarization signal PL1.

A second oscillation mode is a mode in which all polarization signals perpendicularly intersect the polarization signals in the first oscillation produced as set forth above. Namely, the relationship shown in Table 1 stands.

TABLE 1

| | First Oscillation Mode | Second Oscillation Mode |
|---|---|---|
| 1 | TM mode (vertical linear) polarization signal PL1 | TE mode (horizontal linear) polarization signal |
| 2 | Right-rotated circular polarization signal PL2 | Left-rotated circular polarization signal |
| 3 | Left-rotated circular polarization signal PL3 | Right-rotated circular polarization signal |
| 4 | TE mode polarization signal PL4 | TM mode polarization signal |
| 5 | TE mode polarization signal PL5 | TM mode polarization signal |
| 6 | Left-rotated circular polarization signal PL6 | Right-rotated circular polarization signal |
| 7 | Right-rotated circular polarization signal PL7 | Left-rotated circular polarization signal |
| 8 | TM mode polarization signal | TE mode polarization signal |

In this way, an external resonator is formed in the magneto-optic disk reading head, two modes of polarization perpendicularly intersecting each other exist in the resonator, and two mode oscillations are concurrently generated. These two modes are at exactly the same level, and the wave-lengths of the signals in two modes are identical. When the Kerr rotation exists, effective cavity lengths $L_1$ and $L_2$ of the resonator at two modes are different from each other due to a phase difference between the left- and right-rotated polarization signals, and thus the oscillation frequencies of the two modes differ.

A detection of a beat frequency shift can be carried out by two methods: A detection of a beat between two polarizations in a same longitudinal mode, or a detection of a beat between two polarizations of different longitudinal modes.

First, a general method of the above detections will be described. A difference $\Delta f$ of the oscillation frequencies: a beat frequency is expressed by the following formula:

$$\Delta f = \frac{c\theta}{2\pi L} \tag{1}$$

where,
c denotes a speed of light ($c \approx 3 \times 10^9$ m/sec),
$\theta$ denotes a rotation angle of a Kerr effect (radian), and
L denotes an effective cavity length of the resonator.

When a data which is a logical one or a logical zero can be stored in a magneto-optic disk at a different rotation angle $\theta_1$ or $\theta_2$, where, for example, the rotation angle $\theta_1$ indicates the logical one, and the rotaiton angle $\theta_2$ indicates the logical zero, beat frequencies $f_1$ and $f_2$ thereof are different, and thus the stored data can be read by discriminating the beat frequencies. The store of the data at the different rotation angles can be achieved by forming a magnetizer of the magneto-optic disk at multilayers. More preferablily, the detection can be achieved by providing a Faraday rotator, described later.

Figure 2:
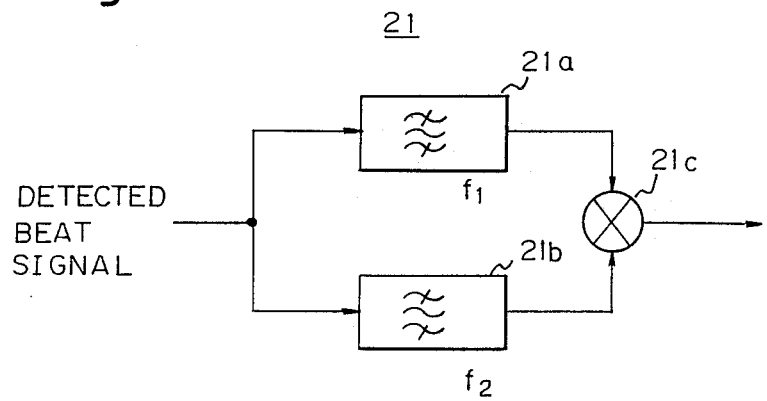
FIG. 2 is a circuit diagram of a filter circuit for extracting a beat signal of the present invention.

The light detector 11, for example, the PIN photo diode, detects the beat signal, and thereafter, the detect beat signal is applied to a filter circuit 21 shown in FIG. 2. The filter circuit 21 includes a low pass filter 21a passing the beat signal having the frequency $f_1$ therethrough, a high pass filter 22a passing the detected beat signal having the frequency $f_2$ therethrough, and an adder 21c.

Next, to specifically explain the meaning of the formula (1) the detection of the beat of the two polarization in different modes is explained with reference to FIGS. 4a to 4e.

FIGS. 3a to 3e are schematically representations of the above construction and wave forms generated thereat. FIGS. 3b and 3c show wave forms of signals reflected at the magneto-optic disk 7. These signals have light frequencies $f_0 + c\theta/4\pi L$ and $f_0 - c\theta/4\pi L$, or $f_0 + \Delta f_{b/2}$ and $f_0 - \Delta f_{b/2}$, where $f_0$ denotes a light oscillation frequency of the laser, c denotes a speed of light, $\theta$ denotes a rotation angle of a Kerr effect, and L denotes an effective cavity length of the resonator, respectively. FIG. 3d shows a wave form of the beat signal, and FIG. 3e shows a wave form of a signal detected by the light detector 11. Since signals output from the output mirror 10 have light frequencies ($f_0 \pm c\theta/4\pi L$) and ($f_0 \mp c\theta/4\pi L$), a frequency shift or difference: a beat frequency $f_b$ is expressed by the following formula:

$$f_b = \frac{c\theta}{2\pi L} \quad (2)$$

Apparently, the difference $\Delta f$ of the oscillation frequencies is equal to the frequency shift $f_b$.

A resonant light frequency $f_0$ is expressed by the following formula:

$$f_0 = \frac{mc}{2L} \quad (3)$$

where, m is a natural number, m=1, 2, ...

For example, in the case of a different longitudinal mode shift, when the effective cavity length L=0.3 m, between adjacent longitudinal modes, the light beat signal having a longiludinal mode distance (or $f(beat)_0$) of 500 MHz is generated (formula (2)). Furthermore, when the Kerr rotation angle $\theta = 0.0052$ (rad) ($\theta = 0.3°$), the beat frequency shift $f_b = 0.828$ MHz. Namely, the light frequency is shifted by the frequency shift from the frequency $f(beat)_0$. The light beat signal is detected by the light detector 10, and the detected beat signal is supplied to a band pass filter 22 shown in FIG. 4 and having a center light frequency ($f_0 + \Delta f_b$) and the beat signal in which the frequency is shifted by the frequency shift $\Delta f_b$ is extracted.

In the above embodiments, since two modes are concurrently generated and the frequency deviation or the frequency shift is detected, the S/N ratio is improved, and as a result, an easy and accurate data reading is obtained.

Referring back to FIG. 1, a polarizer 99 for interacting two mode light signals can be provided between the output mirror 10 and the detector 11.

Figure 4:
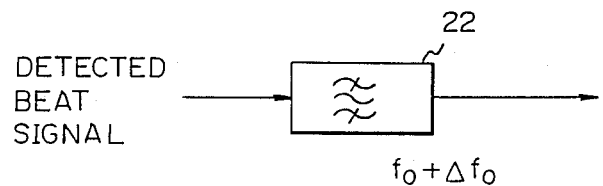
FIG. 4 is a circuit diagram of a filter circuit of the present invention.

In FIGS. 2 and 4, the filters can be realized by a low cost filter, since the frequency shift or the frequency deviation is constant, i.e., the frequency shift or the frequency deviation is determined by the saturated Kerr rotation angle.

Figure 5:
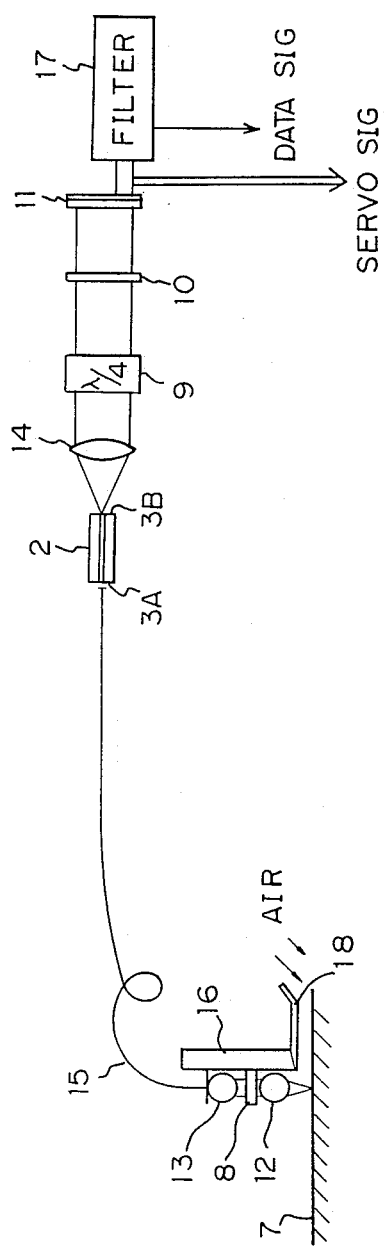

FIGS. 5 and 6 show the details of the magnetic-optic disk reading head in accordance with the present invention.

In FIG. 5, a constant polarization fiber 15 operatively connects the semiconductor laser 2 and the quarter wave plate 8 through the collimating lens 13. The laser 2 is fixed on a magneto-optic disk body (not shown), and the lens 13, the quarter wave plate 8, and the objective lens 12 are mounted on an actuator 16. The actuator 16 is fixed on a slider 18.

When the magneto-optic disk 7 is rotated, the slider 18 is floated from the magneto-optic disk 7 by an air flow caused by the rotation of the magneto-optic disk 7 and forced into a gap between the slider 18 and the magneto-optic disk 7. The gap may be equal to or less than 1 $\mu$m ($10^{-6}$ m). The collimating lens 13, the quarter wave plate 8, and the objective lens 12 are moved above the magneto-optic disk 7 by the actuator 16. The only movable elements of the magneto-optic disk reading head are the actuator 16, the lens 13, the quarter wave plate 8 and the objective lens 12, and accordingly, the moving portion of the reading head is compact and light weight.

The constant polarization fiber 15 forms a part of the external resonator, and a length of the fiber 15 determines the effective cavity length L of the external resonator. Namely, the frequency deviation can be selected by suitably selecting the length of the fiber 15. For example, if the length of the fiber 15 is approximately 0.3 m, the beat frequency f is approximately 500 MHz, as set forth above.

In practice, the optical path lengths of two modes are varied by the distance between the magneto-optic disk 7 and the collimating lens 13 due to the floating of the actuator 16, and bending of the fiber 15, etc., but these changes of the optical path lengths are very small, compared with the cavity lengths, and since these changes appear in the same way in the two modes, the beat signal is not substantially effected by the changes of the optical path lengths. Further, the time of a change is very slow, compared with the beat signal. For example, a frequency of the optical path is on the order of KHz, and the frequency of the beat signal is 500 MHz. Accordingly, the above changes of the optical path length can be ignored.

The data recorded in the magneto-optic disk 7 is read by detecting the beat signal. Further, all of the intensity of the beat signal can be used for a servo signal, which can be used for tracking the reading head through the actuator 16, and for focusing the light signal from the objective lens 12. The servo signal and the data are separated by an electrical filter 17, and thus the crosstalk thereof can be higher than that of an optical device.

FIG. 6 shows a modification of the magneto-optic disk reading head shown in FIG. 5. In FIG. 6, the semoconductor laser 2 is mounted on the actuator 16.

A second embodiment of the present invention will be described.

The beat signal due to the Kerr rotation can be easily detected when the polarization at the magneto-optic disk 7 is a circular polarization. If an error of the polarization generated at the quarter wave plate through which the light is passed occurs, the circular polarization is not established at the magneto-optic disk 7, and the change of the beat signal is reduced. For example, when a setting angle of the quarter wave plate is shifted from a normal angle, the change of the beat signal can be reduced and a margin of the error for setting the reading head is also reduced. The second embodiment solves this problem.

In addition, in the first embodiment, a means for directly detecting a distance between the reading head and the magneto-optic disk is not provided, and the focusing signal is obtained. The detection of the focusing signal requires a complex construction, and thus a complex reading head. The second embodiment also solves this second problem.

Furthermore, the frequency change of the beat signal due to the Kerr rotation can be fluctuated by, for example, a vibration of a plane of the magneto-optic disk. This results in a low operational stability. The second embodiment further solves this third problem.

Referring to FIG. 7, in addition to the magneto-optic disk reading head shown in FIG. 1, a Faraday rotator 6 is provided between the quarter wave plate 13 and the magneto-optic disk 7, i.e., between the quarter wave plate 13 and the objective lens 12 provided in front of the magneto-optic disk 7. A rotation angle of the Faraday rotator 6 is larger than the Kerr rotation angle. When the Faraday rotator 6 is provided, oscillation frequencies of the two mode signals are proportionally varied due to the Faraday rotation. The Faraday rotator 6 converts the Kerr rotation angles $+\theta$ and $-\theta$ to at least $+2\theta$ and 0.

The Faraday rotator 6 is comprised of a YIG crystal 61 and a magnet 61 for applying a magnetic field, and can be provided between the quarter wave plate 9 and the output mirror 10, for example, the half mirror.

FIGS. 8a to 8e are schematically representations of the above construction and wave forms generated thereat, and correspond to FIGS. 3a to 3e. The light beat frequency $f_b$ is expressed by the following formula:

$$f_b = \frac{C\phi}{\pi L} \pm \frac{C\theta}{4\pi L} \quad (4)$$

where, $\phi$ denotes a rotation angle of the Faraday rotator.

The first term $C\phi/\pi L$ is a bias component, and the second term $+\Delta f_b = C\theta/4\pi L$ or $-\Delta f_b = -C\theta/4\pi L$ is a Kerr rotation component.

Figure 9:
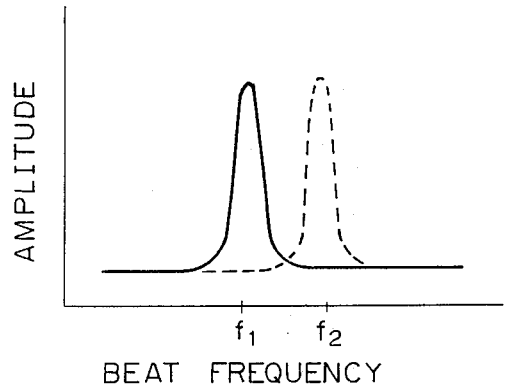
FIG. 9 is a graph representing wave forms of a beat signal obtained in the magneto-optic disk reading head shown in FIG. 7.

When two light signals having different frequencies from each other are superimposed, a beat signal due to a frequency difference is generated as shown in FIG. 9. The beat signal can be set to different frequencies $f_1$ and $f_2$ thereof in response to the directions of the vertical magnetization in the magneto-optic disk 7, i.e., a upward magnetization direction and a downward magnetization direction, as shown by solid and dotted lines in FIG. 9.

Figure 10:
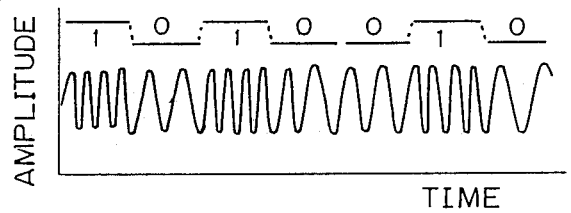
FIG. 10 is a graph showing a wave form of an FSK signal obtained in the magneto-optic disk reading head shown in FIG. 7.
Figure 11:
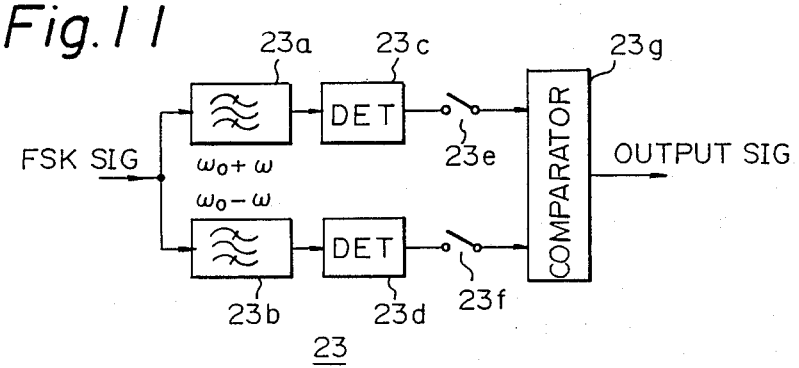
FIG. 11 is a circuit diagram of an FSK signal processing circuit of the present invention.

FIG. 10 shows a wave form of the detected beat signal, which is a frequency shift keying (FSK) signal. Accordingly, the data used can be easily carried out by a conventional detection circuit 25 shown in FIG. 11. The detection circuit 23 includes a first filter 23a having a center frequency $(f_0 + \Delta f_b/2)$, a first envelope detector 23c, a first sampler 23e, a second filter 23b having a center frequency $(f_0 - \Delta f_b/2)$, a second envelope detector 23d, a second sampler 23f, and a comparator 23g.

Figure 12:
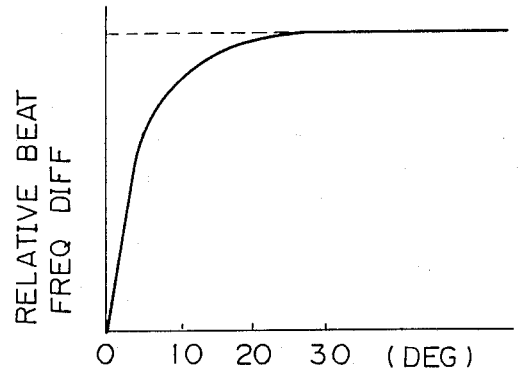
FIG. 12 is a graph showing the relationship between a relative beat frequency difference and a rotation angle of a Faraday rotator in FIG. 8.

FIG. 12 shows a characteristic of a rotation angle of the Faraday rotator (the abscissa) and a relative frequency difference of the beat signal (the ordinate), i.e., a frequency difference when an error of a setting angle of the quarter wave plate occurs. A dotted line shows a relative frequency difference when no error of the setting angle occurs. When the rotation angle is zero, i.e., the Faraday rotator 6 is not provided, the relative beat frequency difference at an angle error of 1° is approximately zero, and the data stored in the magneto-optic disk cannot be read. Conversely, when the rotation angle of the Faraday rotator 6 is provided, the relative beat frequency difference is increased. For example, when the rotation angle is 20°, the relative beat frequency difference is approximately equal to that when the error of the setting angle does not exist. When the rotation angle of the Faraday rotator is sufficiently large, the polarization at the magneto-optic disk 7 becomes approximately a circular polarization, and a detioration of the change of the beat signal does not occur.

Figure 13:
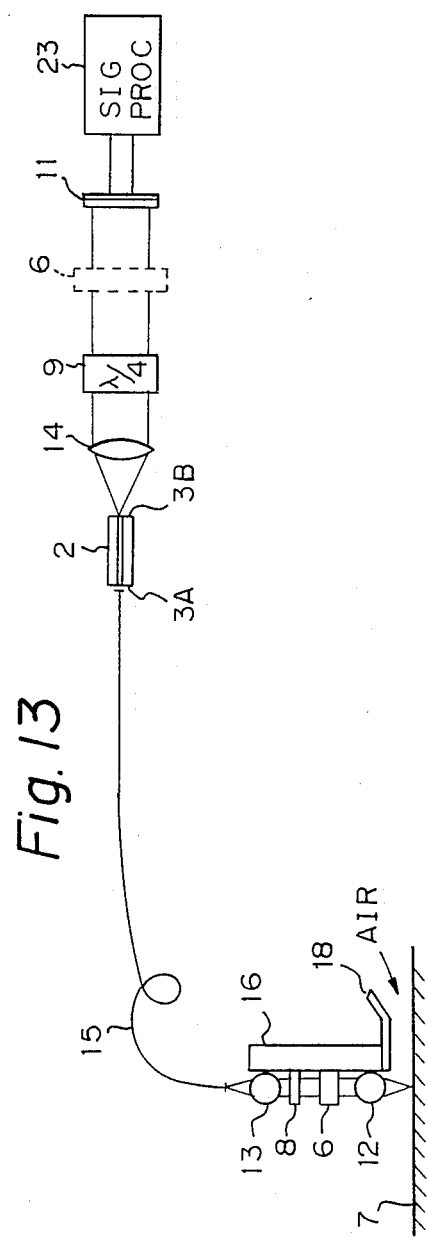
FIG. 13 is a detailed diagram of a magneto-optic disk reading head of FIG. 8.

FIG. 13 shows a specific magneto-optic disk reading head, and corresponding to FIGS. 6 and 7. The Faraday rotator 6 is provided between the quarter wave plate 8 and the objective lens 12, or between the quarter wave plate 9 and the output mirror 11. The FSK detection circuit 23 is connected to the PIN photo diode 11.

Figure 14:
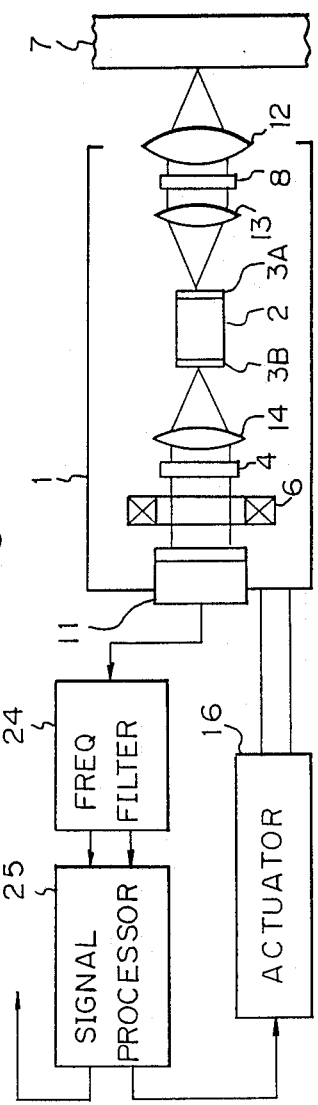
FIG. 14 is a block diagram of still another embodiment of a magneto-optic disk reading head in accordance with the present invention.
Figure 15A:
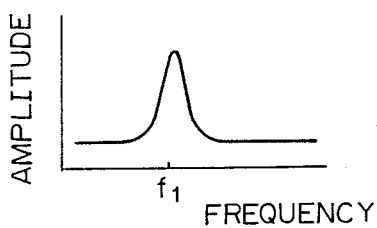
FIGS. 15a to 15d, and FIGS. 16a to 16d are graphs showing wave forms in FIG. 14.
Figure 16A:
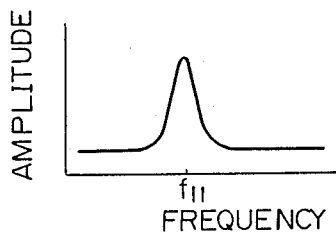
Figure 15B:
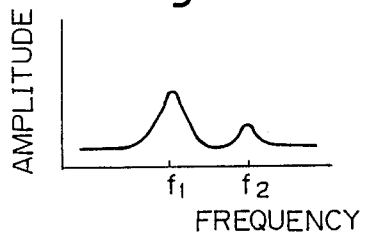
Figure 16B:
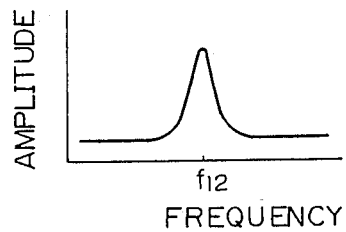
Figure 15C:
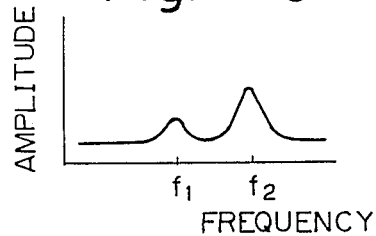
Figure 16C:
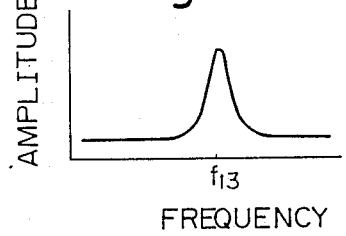
Figure 15D:
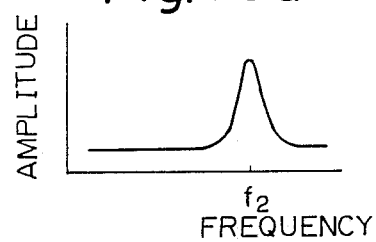
Figure 16D:
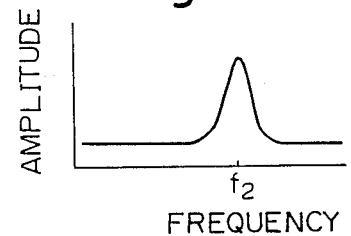

FIG. 14 shows a construction for solving the second problem. In FIG. 14 a moving portion 1 of the read head is mounted on the actuator 16, and a frequency filter 24 and a signal processor 25 are provided. The frequency filter 24 detects only a peak of the beat signal output from the light detector 11, and the signal processor 25 calculates a change of a cavity length in response to a variation of the peak.

The frequency $f_b$ of the beat signal is expressed by $f = c\theta/2\pi L$. When the cavity length L is constant, the beat frequency $f_b$ is proportional to the Kerr rotation angle $\theta$. If the cavity length L is varied, the beat frequency $f_b$ is reversely and continuously proportioned to the cavity length L. Accordingly, a focusing signal can be obtained by monitoring the beat frequency $f_b$.

The signal output from the light detector 11 comprises a beat signal change component due to the magneto-optic signal and a beat signal change component due to the change of the cavity length. These beat signal change components must be separated.

As shown in FIGS. 15a to 15d, the beat signal change due to the magneto-optic signal has frequencies $f_1$ and $f_2$ corresponding to the upper and lower directions of the magnetization and have no middle frequency, because the magnetization of the magneto-optic disk 7 is saturated. Conversely, as shown in FIGS. 16a to 16d, the frequency of the beat signal change due to the change of the cavity length is continuously varied. Taking these differences account into, the above two beat signal changes can be separated by the frequency filter 25 and the signal processor 25. The signal processor 25 outputs the focusing signal to drive the actuator 16 to maintain a distance between the magneto-optic disk 7 and the head moving portion 1, and as a result, if the plane of the magneto-optic disk 7 vibrates, the focusing distance is maintained at a predetermined distance to improve the data read accuracy.

On the other hand, a speed change of the magneto-optic signal, which is determined by a time at which a light crosses each pit in the disk in response to the rotation of the disk, is several MHz to several tens MHz, and the frequency of the focusing signal is proportional to the rotation of the disk and may be several KHz. The beat signal changes also can be separated by taking into account these frequency differences.

Figure 18A:
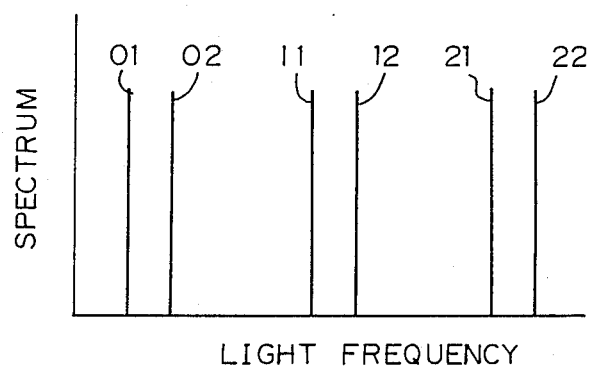
FIGS. 18a and 18b are graphs representing spectra of light and a beat signal in FIG. 17.
Figure 18B:
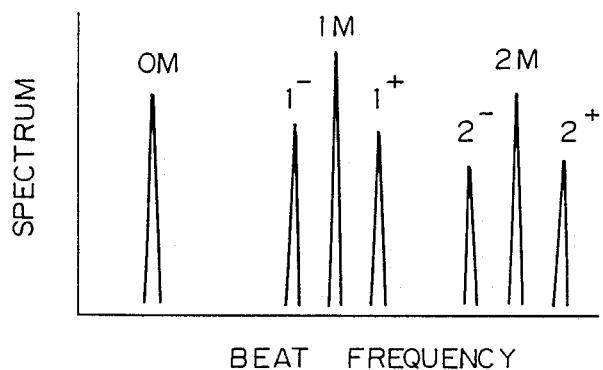

FIG. 17 shows another example of a magneto-optic disk reading head. In the external resonator type reading head, a zero-order mode (OM) beat signal shown in FIG. 18b, which is generated by the interaction of adjacent lights 01 and 02 generated by the Kerr rotation and shown in FIG. 18a, is used. Nevertheless, in the external resonator, in addition to the lights 01 and 02 of the zero-order, lights 11 and 12 of a first order mode 1M, lights 21 and 22 of a second order mode 2M, and so on, exist, and these lights interfere with each other and generate many beat signals. In FIG. 18b, the interaction of the lights 01 and 02 produces a single 0-order beat signal 0M, the interaction of the light 01 of the 0-order beat signal and the light 11 of the first-order beat signal produces a first-order longitudinal mode beat signal 1M, and the interaction of the light 01 and the light 21 of the second-order mode produces a second-order longitudinal mode beat signal 2M. The interaction of the light 01 of the 0-order mode and the light 12 of the first-order mode produces a first beat signal 1+, and the interaction of the light 02 of the 0-order mode and the light 11 of the first-order mode produces a first-order beat signal 1−. Similarly, the interaction of the light 01 of the 0-order mode and the light 22 of the second-order mode produces a second order beat signal 2+, and the interaction of the light 02 of the 0-order mode and the light 21 of the second order mode 21 produces a second order beat signal 2−.

The light detector 11 detects light on which the 0-order beat signal and other beat signals are superimposed, and a frequency filter 27 shown in FIG. 17 extracts the 0-order beat signal which is used for reading the data. If the frequency of the 0-order beat signal is shifted for a reasons other than the Kerr rotation, the frequency filter 27 extracts the first-order beat signals 1+ and 1−. These first-order beat signals 1+ and 1− are compared with the 0-order beat signal at a signal processor 28 shown in FIG. 17, to eliminate the frequency shift of the beat signal, and as a result, the frequency shift is corrected and a stable operation of the magneto-optic disk reading head is established.

Many widely different embodiments of the present invention may be constructed without departing from the spirit and scope of the present invention. It should be understood that the present invention is not limited to the specific embodiments described in this specification except as defined in the appended claims.

What is claimed is:

1. A magneto-optic disk reading head system for reading data magneto-optically stored in a magneto-optic disk, comprising an orthogonal two mode oscillation type resonator formed by a predetermined effective cavity length and outputting a beat signal indicating said stored data,
    said resonator comprising
        a laser means including a semiconductor laser for emitting orthogonal two mode lights from one end thereof,
        a first polarization means provided to receive said incident lights, for polarizing said incident lights,
        said magneto-optic disk provided to receive said lights polarized by said first polarization means, for changing angles of said polarized lights in response to said data and for reflecting said angle changed polarized lights to said first polarization means to be further polarized thereat, said laser means passing said further polarized lights to another end of said laser means,
        a second polarization means provided to receive said lights passed through said laser means, for polarizing said passed lights, and
        a semi-transparent mirror means provided to receive said lights polarized at said second polarization means, for reflecting a part of said lights polarized at said second polarized means, said part of said lights includes said incident lights to said second polarization means to be further polarized thereat, and passing a beat light,
        said incident lights further polarized at said second polarization means being directed to and passing through said laser means,
        a distance between said magneto-optic disk and said semitransparent mirror means defining said effective cavity length,
        said resonator substantially resonating said orthogonal two mode lights therein,
        said beat light output from said semitransparent mirror means having a frequency defined by said effective cavity length and said angles changed at said magneto-optic disk.

2. A magneto-optic disk reading head system according to claim 1, wherein said first polarization means comprises a first quarter wave plate.

3. A magneto-optic disk reading head system according to claim 2, wherein said second polarization means comprises a second quarter wave plate.

4. A magneto-optic disk reading head system according to claim 3, further comprising an optical detection means, provided to receive said beat light, for detecting said beat light and converting said detected beat light to an electrical signal.

5. A magneto-optic disk reading head system according to claim 4, further comprising a filter means operatively connected to said optical detection means, having a predetermined center frequency corresponding to said frequency of said beat light, for extracting a signal indicating said data stored in said magneto-optic disk.

6. A magneto-optic disk reading head system according to claim 3, wherein said resonator further comprises a Faraday rotator provided between said magneto-optic disk and said first quarter wave plate or between said second quarter wave plate and said semi-transparent mirror means,
    said Faraday rotator having a rotation angle greater than said angle changed at said magneto-optic disk,
    an output light output from said semitransparent mirror means being a frequency shift keying modulation (FSK) light signal.

7. A magneto-optic disk reading head system according to claim 6, further comprising an optical detection means, provided to receive said FSK light signal, for detecting said FSK light signal and converting to an electrical signal.

8. A magneto-optic disk reading head system according to claim 7, further comprising a FSK signal processing circuit means for extracting a signal indicating said data stored in said magneto-optic disk.

9. A magneto-optic disk reading head system according to claim 8, further comprising a servo signal generation circuit means, operatively connected to said optical detection means, for generating a servo signal from said beat signal,
    said servo signal being used for driving a moving portion of said reading head in a radial direction of said magneto-optic disk.

10. A magneto-optic disk reading head system according to claim 9, further comprising a focus control signal generation circuit means operatively connected to said optical detecting means, for generating a focus control signal based on a zero-order mode signal contained in said beat signal, and for indicating said stored data and one or more-order mode signal contained in said beat signal,
    said focus control signal being used for controlling a focus of said incident lights to said magneto-optic disk.

11. A magneto-optic disk reading head system according to claim 7, further comprising a focus control signal generation circuit means, operatively connected to said optical detection means, for generating a focus control signal based on a zero-order mode signal contained in said beat signal, and for indicating said stored data with one or more-order mode signal contained in said beat signal, said focus control signal being used for controlling a focus of said incident lights to said magneto-optic disk.

12. A magneto-optic disk reading head system according to claim 1, further comprising a floating type actuator means which is floated by air forced into a gap between said magneto-optic disk and said actuator means, and moved in a radial direction of said magneto-optic disk and/or a focusing direction perpendicular to said radial direction, said air being generated in response to a rotation of said magneto-optic disk.

13. A magneto-optic disk reading head system according to claim 12, wherein said first polarization means is mounted on said actuator means, and said first polarization means and said laser in said laser means are optically connected by an optical fiber.

14. A magneto-optic disk reading head system according to claim 12, wherein said said laser in first polarization means and said laser means are mounted on said actuator means, and said laser and said second polarization means are optically connected by an optical fiber.

* * * * *

UNITED STATES PATENT AND TRADEMARK OFFICE
CERTIFICATE OF CORRECTION

PATENT NO. : 4,955,006
DATED : September 4, 1990
INVENTOR(S) : Nobuhiro Fukushima It is certified that error appears in the above-identified patent and that said Letters Patent is hereby corrected as shown below:

Col. 12, line 29, "angle" should be --angles--.

Signed and Sealed this

Twenty-fifth Day of February, 1992

Attest:

HARRY F. MANBECK, JR.

*Attesting Officer*  *Commissioner of Patents and Trademarks*